US012366793B2

(12) United States Patent
Ueda (10) Patent No.: US 12,366,793 B2
(45) Date of Patent: Jul. 22, 2025

(54) ELECTRONIC APPARATUS

(71) Applicant: CANON KABUSHIKI KAISHA, Tokyo (JP)

(72) Inventor: Haruhisa Ueda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 132 days.

(21) Appl. No.: 18/152,661

(22) Filed: Jan. 10, 2023

(65) Prior Publication Data

US 2023/0266645 A1 Aug. 24, 2023

(30) Foreign Application Priority Data

Feb. 22, 2022 (JP) ................ 2022-026117

(51) Int. Cl.
*H04N 23/50* (2023.01)
*G03B 17/02* (2021.01)
*G03B 17/55* (2021.01)

(52) U.S. Cl.
CPC ............. *G03B 17/55* (2013.01); *G03B 17/02* (2013.01); *H04N 23/50* (2023.01)

(58) Field of Classification Search
CPC ........ G03B 17/55; G03B 17/02; H04N 23/50; H04N 23/00; H04N 23/51; H04N 23/52; H01L 23/36; H01L 23/3677
See application file for complete search history.

(56) References Cited

U.S. PATENT DOCUMENTS

2018/0376037 A1* 12/2018 Arai ................... H05K 7/20172

FOREIGN PATENT DOCUMENTS

| JP | 2009071722 A | * | 4/2009 |
| JP | 2020-010237 A | | 1/2020 |

OTHER PUBLICATIONS

Electronic Camera (Year: 2009).*

* cited by examiner

*Primary Examiner* — Twyler L Haskins
*Assistant Examiner* — Surafel Yilmakassaye
(74) *Attorney, Agent, or Firm* — Canon U.S.A., Inc. IP Division

(57) ABSTRACT

An electronic apparatus includes an exterior cover, a circuit board, a first heat generating element, a metal plate, a duct, an air inlet, and an air outlet. Fins, respectively formed on the exterior cover and the metal plate face each other in the duct in a direction orthogonal to the circuit board, have tops that overlap each other in the orthogonal direction, as viewed from a direction parallel to a direction in which the circuit board extends. A distance between the exterior cover fin tip and the metal plate in the orthogonal direction is greater than an amount of the overlap between the exterior cover fin tip and the metal plate fin tip. A distance between the metal plate fin tip and the exterior cover in the orthogonal direction is greater than the amount of the overlap between the exterior cover fin tip and the metal plate fin tip.

8 Claims, 7 Drawing Sheets

ELECTRONIC APPARATUS

BACKGROUND

Field

The present disclosure relates to an electronic apparatus having a heat dissipation structure for a heat generating element.

Description of the Related Art

A heat dissipation structure of a conventional electronic apparatus will be described.

For example, Japanese Patent Application Laid-Open No. 2020-010237 discusses an image pickup apparatus including a first housing unit holding a circuit board that generates heat, and a second housing unit serving as an exterior cover with a monitor and fixed to the first housing unit at a predetermined distance therefrom.

A space having the predetermined distance forms an air flow passage by communicating with outside air via a top surface opening exposed on a top surface of the image pickup apparatus and a rear surface opening exposed on a rear surface of the image pickup apparatus.

A rear surface portion of the first housing unit forming the air flow passage has a heat dissipation structure shaped like a fin for increasing the surface area of a surface facing the second housing unit, and dissipates the heat generated by the circuit board to the outside of the image pickup apparatus by thermally connecting an electronic component and the heat dissipation structure.

The image pickup apparatus discussed in Japanese Patent Application Laid-Open No. 2020-010237 can dissipate the heat by natural convection from the rear surface to the top surface of the image pickup apparatus, but does not have a structure for forcibly dissipating the heat using a fan or the like.

For this reason, the heat is released to a top surface portion of the image pickup apparatus if forcible air cooling is performed using an accessory such as a fan, and thus it is not desirable to employ a configuration in which a component such as a viewfinder to be in proximity to a user's eye is provided at the top surface portion.

In addition, because the fin is provided only in the first housing unit holding the circuit board that generates heat, the image pickup apparatus has a configuration that makes it easy to dissipate the heat of the circuit board, but does not have a configuration that actively dissipates heat from the second housing unit serving as the exterior cover.

SUMMARY

The present disclosure is directed to providing a heat dissipation structure that can release heat to an appropriate place by controlling an air flow passage for forcible air cooling using an accessory such as a fan, and can actively dissipate heat from an exterior cover by both of natural convection and forced convection.

According to an aspect of the present disclosure, an electronic apparatus includes an exterior cover, a circuit board disposed inside the exterior cover, a first heat generating element disposed on the circuit board, a metal plate thermally connected to the first heat generating element, a duct formed in a region between the exterior cover and the metal plate, an air inlet formed in the exterior cover and configured to take air into the duct, and an air outlet configured to release air from the duct, wherein a fin formed on the exterior cover and a fin formed on the metal plate are disposed inside the duct to face each other in a direction orthogonal to the circuit board, wherein a tip of the fin of the exterior cover and a tip of the fin of the metal plate overlap each other in the direction orthogonal to the circuit board, as viewed from a direction parallel to a direction in which the circuit board extends, wherein a distance between the tip of the fin of the exterior cover and the metal plate in the direction orthogonal to the circuit board is greater than an amount of the overlap between the tip of the fin of the exterior cover and the tip of the fin of the metal plate, and wherein a distance between the tip of the fin of the metal plate and the exterior cover in the direction orthogonal to the circuit board is greater than the amount of the overlap between the tip of the fin of the exterior cover and the tip of the fin of the metal plate.

Further features of the present disclosure will become apparent from the following description of exemplary embodiments with reference to the attached drawings.

DESCRIPTION OF THE EMBODIMENTS

Exemplary embodiments of the present disclosure will be described in detail below with reference to the drawings.

<External Perspective View of Electronic Apparatus>

Figure 1A:
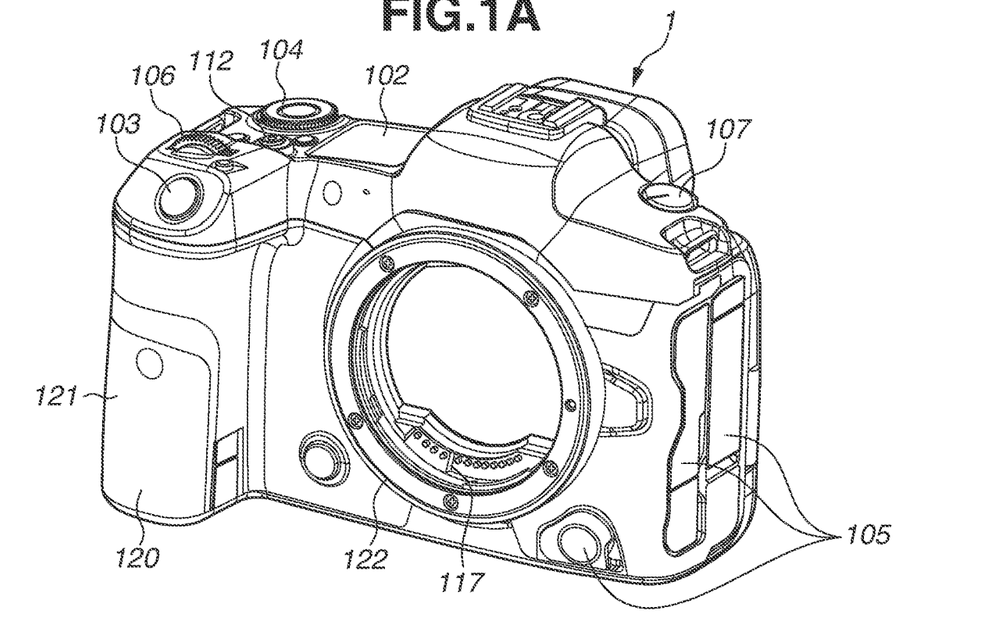
FIGS. 1A and 1B are external perspective views of an electronic apparatus according to an exemplary embodiment of the present disclosure.
Figure 1B:
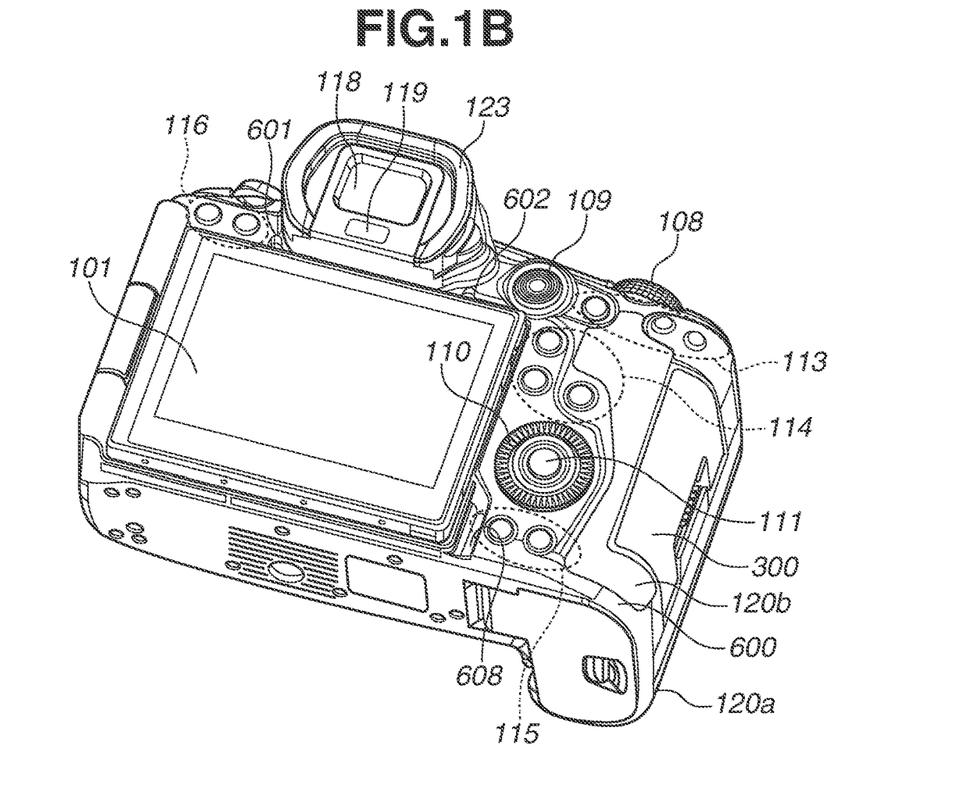

FIGS. 1A and 1B are external perspective views of an electronic apparatus according to an exemplary embodiment of the present disclosure.

A configuration of a camera system including a camera main body (hereinafter also referred to as a digital camera) 1 and an interchangeable lens (not illustrated) will be described with reference to FIGS. 1A and 1B.

FIG. 1A is a front perspective view of the camera main body 1, and FIG. 1B is a rear perspective view of the camera main body 1.

A display unit 101 is provided on a rear surface of the camera main body 1 and displays an image and various information.

The display unit 101 is equipped with a touch panel 465 (see FIG. 2) and can detect a touch operation on a display screen (an operation surface) of the display unit 101.

A viewfinder 118 is a display unit provided on a top surface of the camera main body 1, and displays various set values for the camera main body 1, including a shutter speed and an aperture.

A shutter button 103 is an operation portion for providing an image capturing instruction.

A mode change switch 104 is an operation portion for switching between various modes.

Terminal covers 105 protect connectors (not illustrated) for a connection cable for connecting the camera main body 1 to an external apparatus and the like.

A main electronic dial 106 is a rotational operation member, and a user can perform operations such as changing the set values including the shutter speed and the aperture by rotating the main electronic dial 106.

A power switch 107 is an operation member for switching between power-on and power-off of the camera main body 1.

An electronic sub-dial 108 is a rotational operation member serving as a second dial operation member, and enables moving a selection frame, image feeding, and the like.

A multi-controller 109 is provided on the rear surface, and enables an input by an operation of tilting a key top in a tilting direction, in addition to an input by an operation of pushing in the key top.

Operations in eight directions including oblique directions, in addition to up, down, left, and right directions, can each be performed as the operation of tilting the key top in the tilting direction. The multi-controller 109 mainly enables moving a selection frame, making a selection in each menu, and the like.

A rear surface electronic dial 110 is a rotational operation member serving as a third dial operation member, and enables moving a selection frame, image feeding, and the like.

The rear surface electronic dial 110 is disposed at a position that makes it easy for the user to intuitively operate the rear surface electronic dial 110 while playing back a captured image on the display unit 101, and to operate the rear surface electronic dial 110 while holding the camera main body 1 vertically.

A SET button 111 is provided in a central portion of the rear surface electronic dial 110. The SET button 111 is a push button and is mainly used to determine a selection.

A moving image button 112 is used to provide instructions to start and stop moving image capturing (recording).

A button group 113 is a group of operation buttons related to focus and exposure, and includes the following three buttons: an automatic focus (AF) start button, an automatic exposure (AE) lock button, and an AF frame selection button. These buttons are arranged in a row.

The user can change AF control and an AF range and perform fixed exposure by pressing the buttons in an image capturing standby state.

A button group 114 includes the following three buttons: an enlargement/reduction button, an information display button, and a quick setting button. These buttons are arranged in L-shape.

The enlargement/reduction button enables the user to turn on and off an enlargement mode in live view display in an image capturing mode, and to turn on and off the enlargement mode for a playback image in a playback mode. The information display button enables the user to switch between display methods for information displayed on the display unit 101. The quick setting button enables a quick transition to setting of image capturing parameters.

A button group 115 includes a playback button and a clear button. The playback button is an operation button for switching between the image capturing mode and the playback mode.

Pressing the playback button of the button group 115 in the image capturing mode causes a shift to the playback mode, so that the latest of the images recorded in a recording card (not illustrated) can be displayed on the display unit 101.

The user can select an image in the playback mode, and clear the selected image by pressing the clear button.

A button group 116 includes a menu button and a rating button. Pressing the menu button enables the user to display a menu screen for enabling various settings on the display unit 101.

The user can intuitively make various settings by using touch operations on the menu screen displayed on the display unit 101, the multi-controller 109, the rear surface electronic dial 110, and the SET button 111.

The rating button enables rating (ranking) for a playback image when pressed in the playback mode.

The interchangeable lens (not illustrated) is detachably attached to a mount portion 122.

A communication terminal 117 is provided inside the mount portion 122, and is used by the camera main body 1 to communicate with the interchangeable lens (which is detachable).

The viewfinder 118 is an eyepiece unit and includes an electronic viewfinder instead of a conventional optical viewfinder. The user can visually recognize a video image displayed inside the viewfinder 118 by looking into the viewfinder 118.

An eye contact detection sensor that detects whether an eye of the user is close to the viewfinder 118 is provided in an eye contact detection unit 119.

An eyepiece portion (or an eyepiece cover) 123 comes into contact with the user when the user looks into the viewfinder 118.

A grip portion 120 is a holding portion having a shape that can be easily gripped by the right hand of the user when the user holds the camera main body 1.

Further, a front rubber member 121 is provided over an area from a front surface to a rear surface of the grip portion 120 so as to have a shape that can be easily fit in a hand and to prevent the grip portion 120 from slipping.

A card lid 300 is used to protect a card slot for storing the recording card. The card lid 300 is provided in a portion to make contact with a palm of the user within the grip portion 120, and the position and the size thereof are determined in consideration of limitations and operability of the internal card slot.

Block Diagram of Configuration Example of Digital Camera

Figure 2:
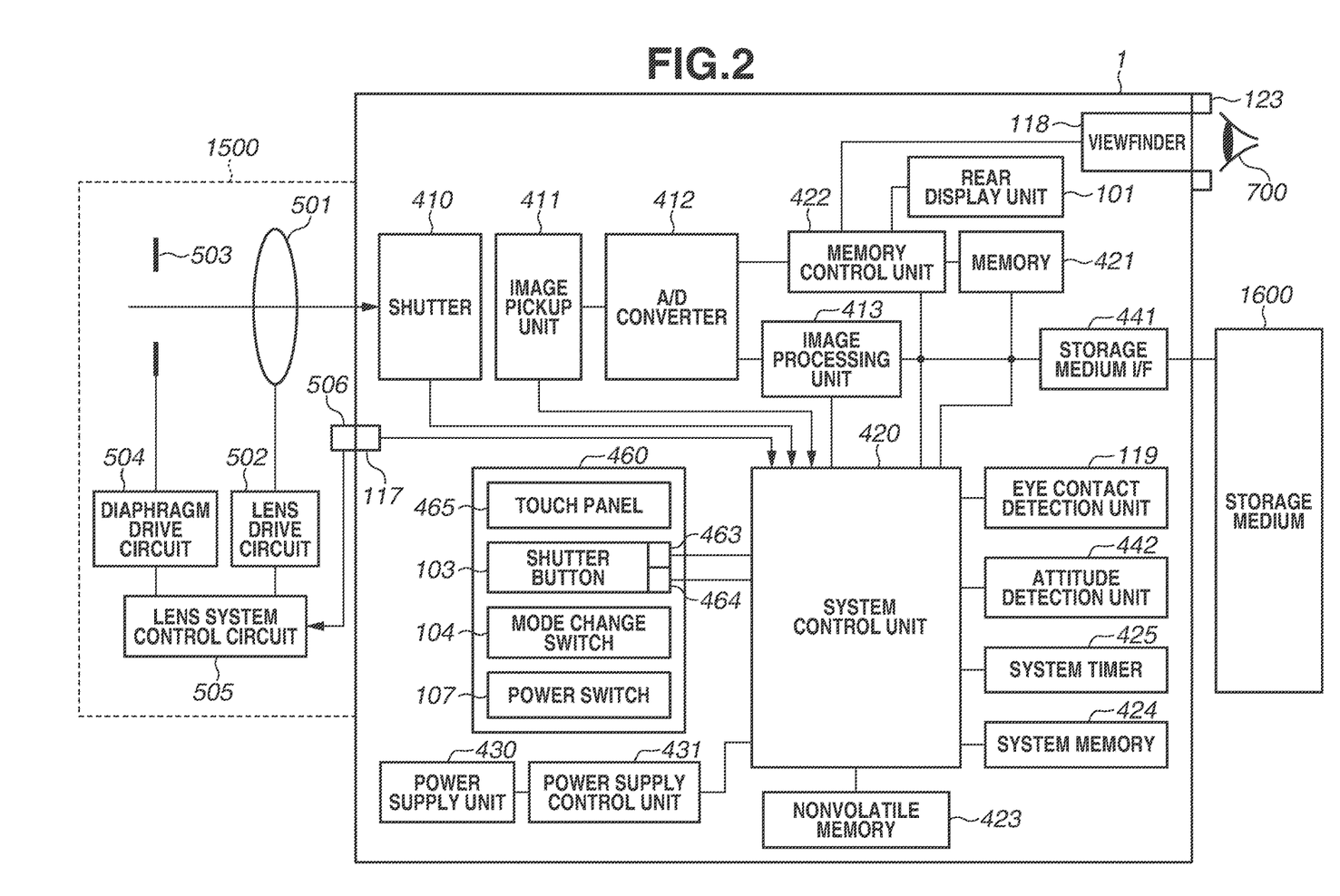
FIG. 2 is a block diagram of a system including the electronic apparatus according to the exemplary embodiment of the present disclosure.

FIG. 2 is a block diagram illustrating an example of a configuration of the digital camera 1 according to the present exemplary embodiment.

A shutter 410 is a focal plane shutter that can freely control the exposure period of an image pickup unit 411 (described below).

The shutter 410 is controlled by a system control unit 420 (described below).

The image pickup unit 411 is an image pickup device having an imaging plane for forming a subject image (an optical image) having passed through a lens 501. The image pickup unit 411 performs photoelectric conversion to output an electrical signal (an analog signal) based on the optical image formed on the imaging plane.

An image sensor such as a charge-coupled device (CCD) sensor or a complementary metal oxide semiconductor (CMOS) sensor is used as the image pickup unit 411.

An analog-to-digital (A/D) converter 412 is a signal conversion unit used to convert the analog signal output from the image pickup unit 411 into a digital signal.

An image processing unit 413 is an image calculation unit that performs resizing processing, such as predetermined pixel interpolation and reduction, and color conversion processing, on the digital signal output from the A/D converter 412 or a digital signal output from a memory control unit 422 (described below) to generate image data.

The system control unit 420 performs aperture position control and lens position control based on the calculation result obtained by the image processing unit 413.

The image processing unit 413 further performs calculation processing using the above-described image data, and performs through-the-lens (TTL) automatic white balance (AWB) processing based on the obtained calculation result.

The system control unit 420 includes at least one processor or circuit, and controls the entire digital camera 1.

The system control unit 420 executes a program stored in a nonvolatile memory 423 (described below), thereby implementing each processing according to the present exemplary embodiment.

A memory 421 is a storage unit that temporarily stores the digital signal obtained by the A/D converter 412 converting the analog signal generated by the image pickup unit 411, and the image data generated by the image processing unit 413.

The memory 421 has a sufficient storage capacity to store a predetermined number of still images, and a moving image and sound for a predetermined time.

The memory control unit 422 is a memory controller that controls transmission and reception of data controlled by the system control unit 420 to and from the A/D converter 412, the image processing unit 413, and the memory 421.

The digital signal output from the A/D converter 412 is directly written into the memory 421 via the image processing unit 413 and the memory control unit 422, or via the memory control unit 422 alone.

The nonvolatile memory 423 is an electrically erasable and recordable read-only storage unit, and stores, for example, constants and programs for operating the system control unit 420.

A system memory 424 is a readable and writable storage unit that stores, for example, the constants, variables, and programs read out from the nonvolatile memory 423 for operating the system control unit 420.

A system timer 425 is a clocking unit that measures a length of time before executing automatic power-off for turning off various display members (described below), and an exposure period.

The automatic power-off is a function of turning off the display members (described below) to prevent battery consumption in a case where it is determined that the user is not operating the digital camera 1.

A power supply unit 430 includes, for example, a primary battery such as an alkaline battery or a lithium battery, a secondary battery such as a nickel-cadmium (NiCd) battery, a nickel metal halide (NiMH) battery, or a lithium-ion (Li) battery, and an alternating current (AC) adapter.

A power supply control unit 431 includes a circuit that detects the power supply unit 430 serving as a power source for driving the digital camera 1, a direct current to direct current (DC-DC) converter, and a switch circuit that switches between power supply destinations.

The power supply unit 430 detects whether a battery is attached, a battery type, and a remaining battery level.

The power supply control unit 431 controls the DC-DC converter based on the above-described detection result and an instruction of the system control unit 420, and supplies an appropriate voltage to a supply destination at appropriate timing.

The communication terminal 117 is provided in the digital camera 1, and electrically connected to a lens communication terminal 506 (described below).

The electrical connection of the communication terminal 117 to the lens communication terminal 506 enables the system control unit 420, which controls the entire digital camera 1, to communicate with a lens unit 1500 (described below).

A storage medium interface (I/F) 441 is an interface with a storage medium 1600 (described below).

An attitude detection unit 442 detects an attitude of the digital camera 1 with respect to a gravity direction.

The attitude detection unit 442 outputs orientation information indicating whether an image picked up by the image pickup unit 411 is an image captured by the digital camera 1 held horizontally or an image captured by the digital camera 1 held vertically, based on the attitude detected by the attitude detection unit 442.

The system control unit 420 can add the orientation information output by the attitude detection unit 442 to the image data.

For example, an acceleration sensor and a gyroscope sensor can be used for the attitude detection unit 442.

In a case where the acceleration sensor and the gyroscope sensor are used for the attitude detection unit 442, a motion state (e.g., a panning state, a tilting state, a lifted state, or a stationary state) of the digital camera 1 can be detected.

The eyepiece portion 123 is a portion to be approached (contacted) by an eye (an object) 700 of the user, in the digital camera 1.

The eye contact detection unit 119 is an approach (contact) detection sensor that detects the approach (contact) and leaving (separation) of the eye 700 to and from the eyepiece portion 123.

The eye contact detection unit 119 detects the contact of the eye 700 with the eyepiece portion 123 based on the presence or absence of light received by a light-receiving portion (not illustrated) of an infrared proximity sensor.

After detecting the contact of the eye 700, the system control unit 420 determines that an eye contact state continues until the separation of the eye 700 is detected.

After detecting the separation of the eye 700, the system control unit 420 determines that a non-eye contact state continues until the contact of the eye 700 is detected.

The infrared proximity sensor is merely an example, and other type of sensor may be adopted for the eye contact detection unit 119 as long as the sensor can detect the approach of an eye or an object as the eye contact state.

The memory 421 described above doubles as a memory (a video memory) for image display.

The digital signal or the image data written in the memory 421 is displayed on the display unit (hereinafter also referred to as the rear display unit) 101 or the viewfinder 118 via the memory control unit 422.

The rear display unit 101 performs display based on a signal from the memory control unit 422.

The viewfinder 118 performs display based on a signal from the memory control unit 422 in a case where the eye contact state is detected by the eye contact detection unit 119.

The digital signals recorded in the memory 421 after obtained by the A/D converter 412 converting the analog signals generated by the image pickup unit 411 are sequentially transferred to the rear display unit 101 or the viewfinder 118 and displayed thereon.

Live view imaging display, which is real-time display, can be thereby performed.

The system control unit 420 switches between display (a display state) and non-display (a non-display state) of each of the rear display unit 101 and the viewfinder 118, depending on the state detected by the eye contact detection unit 119 described above.

In the non-eye contact state, the rear display unit 101 is in the display state, and the viewfinder 118 is in the non-display state.

In the eye contact state, the viewfinder 118 is in the display state, and the rear display unit 101 is in the non-display state.

An operation unit 460 includes various operation members serving as an input unit that accepts operations from the user.

More specifically, the operation unit 460 includes the following operation members: the mode change switch 104, the shutter button 103, a first shutter switch 463, a second shutter switch 464, the touch panel 465, and the power switch 107.

The operation unit 460 also inputs various operation instructions to the system control unit 420.

The mode change switch 104 is used to change the operating mode of the system control unit 420 to any of modes including a still image capturing mode and a moving image capturing mode.

The still image capturing mode includes an automatic image capturing mode, an automatic scene determination mode, and a manual image capturing mode, as image capturing modes.

The still image capturing mode further includes an aperture priority mode (Av mode), a shutter speed priority mode (Tv mode), and a program AE mode (P mode), as image capturing modes.

The moving image capturing mode may similarly include a plurality of image capturing modes.

The shutter button 103 is used by the user to give an image capturing preparation instruction and an image capturing instruction.

The first shutter switch 463 is turned on when the shutter button 103 of the digital camera 1 is operated halfway, i.e., enters a half-press state (to give the image capturing preparation instruction), thereby generating a first shutter switch signal SW 1.

Based on the first shutter switch signal SW 1, the digital camera 1 starts image capturing preparation operations, such as AF processing, AE processing, and AWB processing.

The second shutter switch 464 is turned on when the shutter button 103 is operated completely, i.e., enters a full-press state (to give the image capturing instruction), thereby generating a second shutter switch signal SW 2.

Based on the second shutter switch signal SW 2, the system control unit 420 performs a series of processes from the readout of the analog signal from the image pickup unit 411 to the signal conversion processing using the A/D converter 412 and the image processing unit 413.

The system control unit 420 also starts image capturing processing operations up to writing the image data temporarily recorded in the memory 421 into the storage medium 1600 (described below).

The touch panel 465 is a device that detects a touch operation or a drag operation performed by the user.

In the present exemplary embodiment, the touch panel 465 is integral with the rear display unit 101, and the user can operate the touch panel 465 by touching a display portion of the rear display unit 101 with a finger.

The power switch 107 is used to power on or off the digital camera 1. The power supply control unit 431 controls power supply from the power supply unit 430 based on the switching operation on the power switch 107.

The lens unit 1500 is an interchangeable lens that is detachably attached to the digital camera 1.

The lens 501 is a lens group for generating an optical image (a subject image) from subject light reflected by a subject, and includes a plurality of lenses. In FIG. 2, one lens is illustrated as the lens 501 for simplification.

The lens communication terminal 506 is used by the lens unit 1500 to communicate with the digital camera 1.

The lens unit 1500 can communicate with the system control unit 420, which controls the entire digital camera 1, by electrically connecting the lens communication terminal 506 to the communication terminal 117 as described above.

This enables the system control unit 420 to communicate with a diaphragm drive circuit 504 and a lens drive circuit 502 via a lens system control circuit 505 to control the position of a diaphragm 503 and the focus state of a real image obtained by displacing the lens 501, respectively.

The storage medium 1600 such as a memory card is detachably attached to the digital camera 1 and is used to store a captured image.

Examples of the storage medium 1600 include a secure digital (SD) card, a FLASH® memory, and a hard disk.

<Perspective View of Bottom Surface of Camera Main Body>

Figure 3:
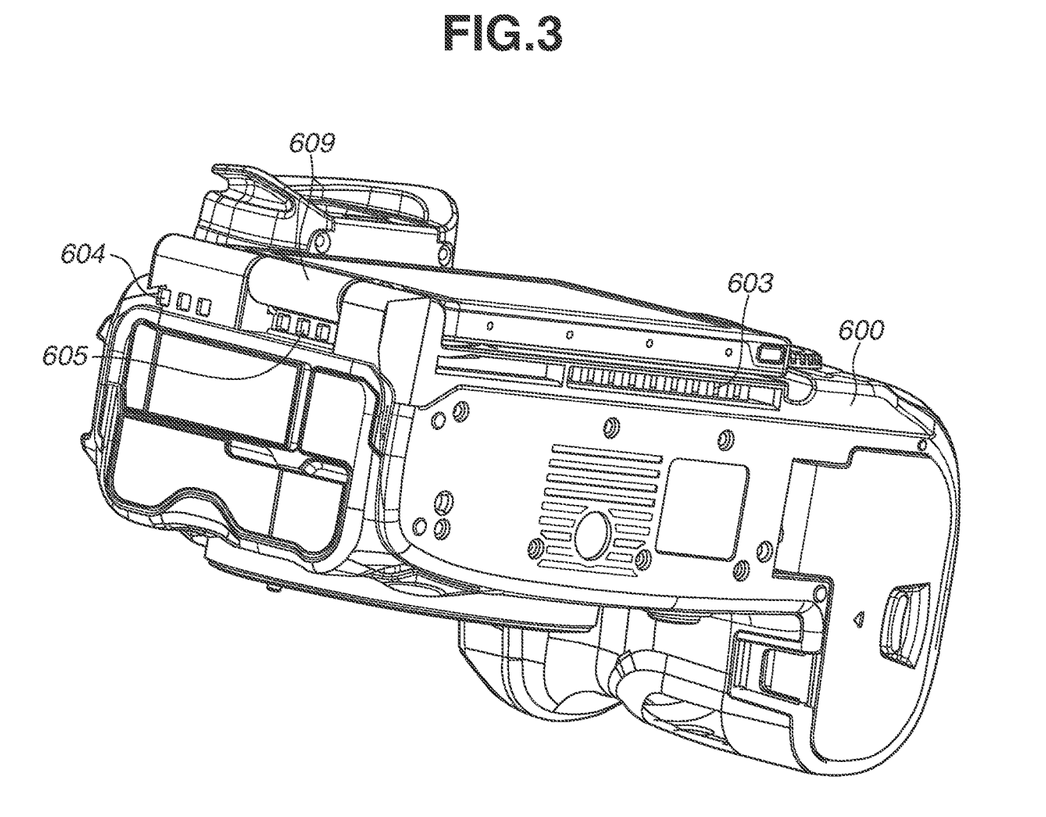
FIG. 3 is an external perspective view of a bottom surface of the electronic apparatus according to the exemplary embodiment of the present disclosure.

FIG. 3 is a perspective view of a bottom surface of the camera main body 1.

Openings 601, 602, 603, 604, and 605 of a rear surface cover 600 will be described with reference to FIGS. 1B and 3.

The openings 601 and 602 for heat dissipation are provided in an upper part of the rear surface cover 600. The openings 601 and 602 are exposed on the rear surface.

The openings 601 and 602 are arranged so that the viewfinder 118 is located therebetween. The opening 601 is arranged to the left of the viewfinder 118 and the opening 602 is arranged to the right of the viewfinder 118 when viewed from the rear surface.

The opening 603 for heat dissipation is provided on a bottom surface of the rear surface cover 600.

The opening 603 is exposed on the bottom surface.

The opening 603 is in a storage portion for storing the display unit 101 that is movable, and is in a right half of the display unit 101 when viewed from the rear surface.

The openings 604 and 605 are exposed on a left side surface of the rear surface cover 600 when viewed from the rear surface.

The openings 604 and 605 are in the storage portion for storing the display unit 101 that is movable, and is in an area from a center to an upper half of the display unit 101 when viewed from the rear surface.

The opening 605 is disposed below a hinge cover 609.

The opening 601 is disposed between the button group 116 and the viewfinder 118, and is at a position lower than the protruding top surfaces of the button group 116.

The opening 602 is disposed between the multi-controller 109 and the viewfinder 118, and is at a position lower than the protruding top surface of the multi-controller 109.

The relationship among the openings 601, 602, 603, 604, and 605 will now be described.

A fan for cooling the camera main body 1 is built in an external accessory (not illustrated).

The external accessory can be attached to the bottom surface of the camera main body 1.

The external accessory can discharge air from the accessory main body by driving the fan built in the accessory.

When the fan of the external accessory is driven in a state where the external accessory is attached to the bottom surface of the camera main body 1, the air discharged from the accessory main body flows into the camera main body 1 from the opening 603.

In other words, the opening 603 serves as an air inlet. The air taken in from the opening 603 is released from the openings 601, 602, 604, and 605 through the inside of the camera main body 1.

In other words, the openings 601, 602, 604, and 605 serve as air outlets. A duct 800 (see FIG. 5A) of the camera main body 1 will be described below.

Heat of a heat generating component inside the camera main body 1 can be dissipated by flowing air from the accessory main body to the inside of the camera main body 1.

The relationship between the duct 800 of the camera main body 1 and the heat generating component inside the camera main body 1 will be described below.

The relationship among the openings 601, 602, 604, and 605 will now be described.

The opening area of the opening 601 is smaller than the opening area of the opening 604, and smaller than the opening area of the opening 605.

Similarly, the opening area of the opening 602 is smaller than the opening area of the opening 604, and smaller than the opening area of the opening 605.

The air flowed in from the opening 603 is mainly released from the openings 604 and 605 because of the difference in opening area.

The amount of air to be released from the openings 601 and 602 is less than the amount of air to be released from the openings 604 and 605.

Thus, the openings 604 and 605 serve as main air outlets.

The openings 601 and 602 are intended to release an upward air current inside the rear surface cover 600 in natural heat dissipation in a state where the accessory main body including the fan is not attached to the camera main body 1.

The center of the opening 601 in the vertical direction of the camera main body 1 and the center of the viewfinder 118 in the vertical direction of the camera main body 1 are not aligned.

Similarly, the center of the opening 602 in the vertical direction of the camera main body 1 and the center of the viewfinder 118 in the vertical direction of the camera main body 1 are not aligned.

Because the centers of the openings 601 and 602 are not aligned with the center of the viewfinder 118 as described above, the air released from the openings 601 and 602 is less likely to hit the eye of the user when the user looks into the viewfinder 118.

The relationship between the opening area of the opening 601 and the opening area of the opening 602 will now be described.

The opening area of the opening 601 is smaller than the opening area of the opening 602.

The opening area of the opening 601 and the opening area of the opening 602 are made different so that the amount of air to be released from the opening 601 and the amount of air to be released from the opening 602 in the air flowed in from the opening 603 are equal to each other.

The amount of air to be released from the opening 602 and the amount of air to be released from the opening 601 are made equal so that the user feels the air in the same way regardless of whether the user looks into the viewfinder 118 with the right eye or the left eye.

The opening 601 is closer to the openings 604 and 605 than the opening 602, and is disposed at a surface different from the surface where the openings 604 and 605 are disposed.

The opening 601 is disposed at an upper surface on the rear surface side of the camera main body 1, and this surface connects the opening 602 to the openings 604 and 605.

The rear surface cover 600 has a recessed shape 608 for opening and closing the display unit 101. The recessed shape 608 enables the user to open and close the display unit 101 while inserting a finger in the recessed shape 608, thereby making it easy to perform the opening and closing operations.

<Exploded Perspective View of Camera Main Body>

Figure 4:
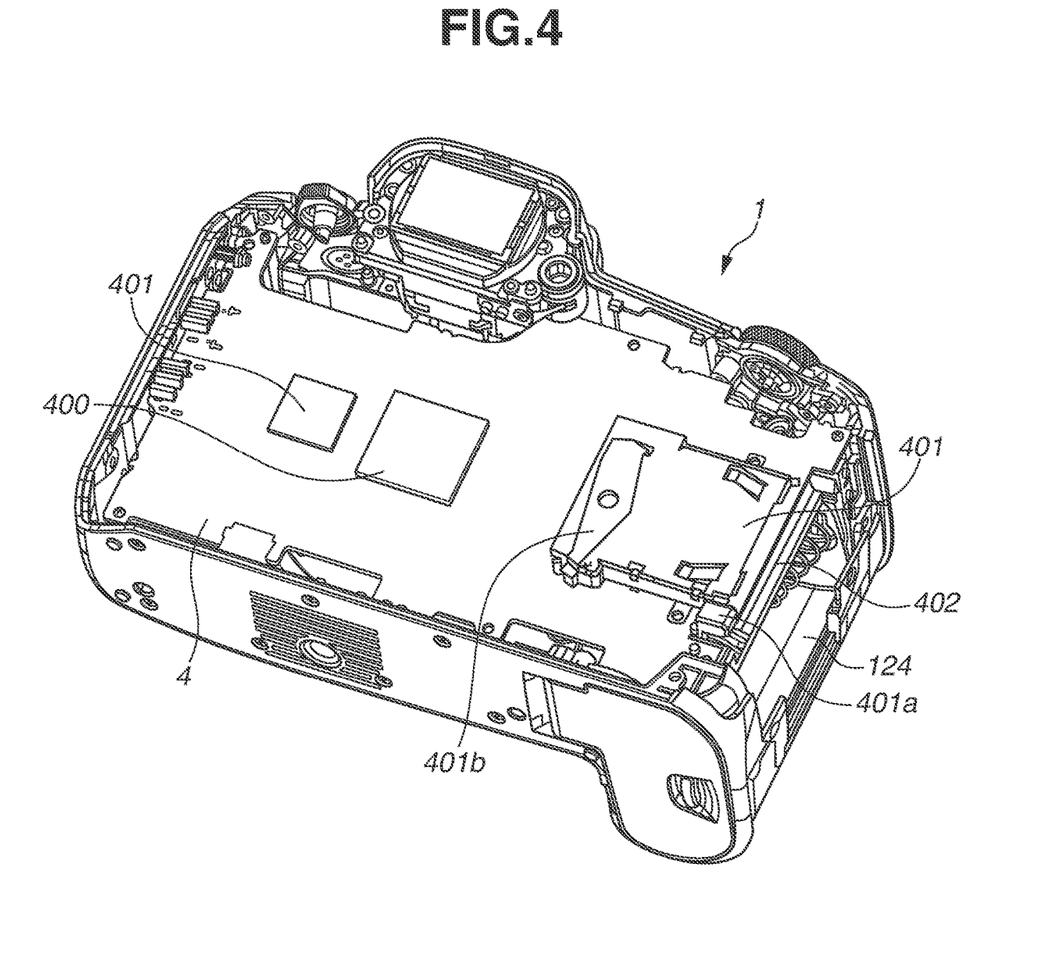
FIG. 4 is an exploded perspective view of the electronic apparatus according to the exemplary embodiment of the present disclosure.

FIG. 4 is an exploded perspective view of the camera main body 1 illustrated in FIGS. 1A and 1B.

FIG. 4 illustrates a state where the rear surface cover 600 and the card lid 300 are removed, and illustrates a main board 4 disposed inside the camera main body 1.

Image processing system integrated circuits (ICs) 400 and 401 are mounted side by side on the main board 4. Because the image processing system ICs 400 and 401 each have a relatively large size, the layout on the main board 4 is limited.

The image processing system IC 400 is a main image processing system that consumes large electric power, and thus generates a larger amount of heat than the image processing system IC 401 which is a sub image processing system.

In the present exemplary embodiment, two card slots of different types (a first card slot 401 and a second card slot 402) are attached on the grip side located to the right of the image processing system IC 400 on the main board 4.

The first card slot 401 is on the rear surface side of the camera main body 1, and the second card slot 402 is on the front surface side of the camera main body 1.

In the present exemplary embodiment, it is assumed that the first card slot 401 is a slot into which a first card (an XQD card or a CFexpress card) is to be inserted, and the second card slot 402 is a slot into which a second card (an SD card) is to be inserted.

The type of memory card is not limited thereto, and a single slot, double slots of the same type, and any other combination of slots may be adopted.

The first card slot 401 is provided with an eject button 401a. The first card (not illustrated) corresponding to the first card slot 401 is to be inserted into the first card slot 401.

When the first card is inserted into the first card slot 401, a lever 401b is rotated to move the eject button 401a in a protruding direction on the right side of FIG. 4.

On the other hand, when the eject button 401a is pushed in, the lever 401b is rotated in the direction opposite to the direction in which the lever 401b is rotated when the first card is inserted, so that the first card is ejected.

The position of the first card slot 401 in the width direction of the camera main body 1 can be limited because of the layout limitation of the image processing system IC 400.

A battery storage portion 124 is on the main body front surface side of the main board 4, and a part of the battery storage portion 124 is exposed in a state where the card lid 300 is removed.

The image processing system IC 400 is an element that generates heat when performing moving image capturing and other type of processing.

<Exploded Perspective View of Rear Surface Cover from Inside>

Figure 5A:
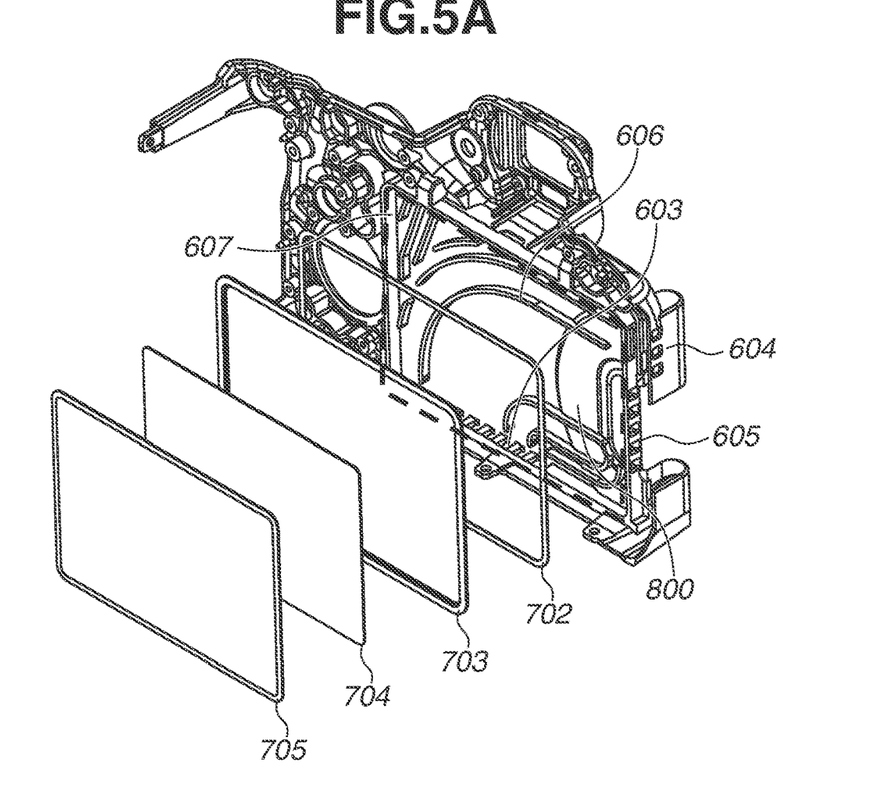
FIGS. 5A and 5B are exploded perspective views of a rear surface cover of the electronic apparatus according to the exemplary embodiment of the present disclosure.
Figure 5B:
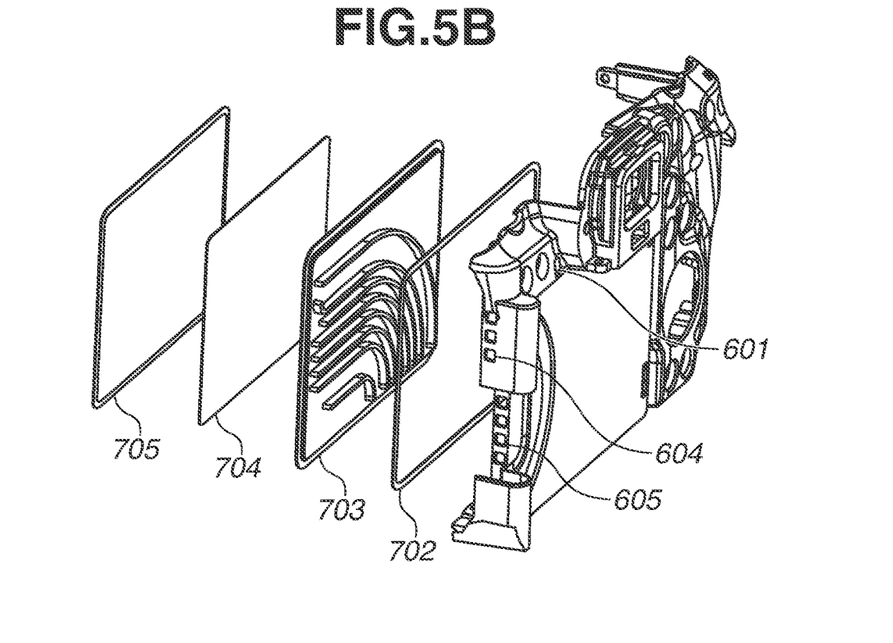

FIGS. 5A and 5B are exploded perspective views of the rear surface cover 600 from inside the digital camera 1. FIG. 5A illustrates an internal appearance of the rear surface cover 600, and FIG. 5B illustrates an external appearance of the rear surface cover 600.

A configuration of the duct 800 into which air can flow from the external accessory (not illustrated) will be described.

The rear surface cover 600 has a sealing rib 607 that separates the inside of the camera main body 1 from the outside air.

The sealing rib 607 is shaped like a wall and extends in the depth direction of the camera main body 1. The wall has four sides.

The inside dimensions of the four sides are set to be about the same as the size of the display unit 101.

The sealing rib 607 with four sides is in a state where no opening is formed to keep airtightness, except the openings 601, 602, 603, 604, and 605 described above.

A double-sided adhesive tape 702 is disposed on the four sides of the sealing rib 607. The double-sided adhesive tape 702 has a hollow shape and faces the four sides of the sealing rib 607.

A metal plate 703 has a quadrangular shape, and the edges of the four sides of the metal plate 703 are bonded to the sealing rib 607 of the rear surface cover 600 by the double-sided adhesive tape 702.

The metal plate 703 is bonded to the sealing rib 607, so that the duct 800 into which air can flow is formed on the rear surface cover 600, and the duct 800 has a uniform thickness in the depth direction of the camera main body 1.

A rear surface cover fin 606 and a metal plate fin 706 (see FIG. 6B) are provided on the rear surface cover 600 and the metal plate 703, respectively, to form an air flow passage in the duct 800 and improve heat dissipation.

Features of the rear surface cover fin 606 and the metal plate fin 706 will be described below.

When the metal plate 703 is bonded to the sealing rib 607, a configuration that separates the inside of the camera main body 1 from the outside air is formed, so that a dust-proof drip-proof configuration of the camera main body 1 is also formed.

Next, the relationship between the thickness of the duct 800 and each of the openings 601, 602, 603, 604, and 605 will be described.

The relationship between the thickness of the duct 800 and each of the openings 601, 602, 603, 604, and 605 is that the width or height of each of the openings 601, 602, 603, 604, and 605 is greater than or equal to the thickness of the duct 800.

A double-sided adhesive tape 704 is affixed onto the metal plate 703, so that a heat dissipation component 705 can be bonded thereto.

The metal plate 703 and the heat dissipation component 705 are bonded together by the double-sided adhesive tape 704, and thus thermally connected to each other.

Each of the image processing system ICs 400 and 401 described above is bonded to the heat dissipation component 705 with a heat dissipation rubber 707 (see FIG. 6B) therebetween, so that the image processing system ICs 400 and 401 and the heat dissipation component 705 are thermally connected to each other.

The heat dissipation component 705 is higher in thermal conductivity than the metal plate 703.

While the heat dissipation component 705 is used in the present exemplary embodiment, each of the image processing system ICs 400 and 401 may be thermally connected to the metal plate 703 with the heat dissipation rubber 707 therebetween, without using the heat dissipation component 705.

When the external accessory (not illustrated) is attached to the camera main body 1 and the fan is driven, air flows into the duct 800, so that the metal plate 703 and the heat dissipation component 705 are cooled.

When the metal plate 703 and the heat dissipation component 705 are cooled, the image processing system ICs 400 and 401 are also cooled at the same time because the image processing system ICs 400 and 401 and the heat dissipation component 705 are thermally connected to each other.

<Duct Shape (Fin Shape on Each of Rear Surface Cover and Metal Plate)>

Next, the shape of the duct 800, which is a feature of the present exemplary embodiment, i.e., the shape of each of the rear surface cover fin 606 and the metal plate fin 706 provided on the rear surface cover 600 and the metal plate 703, respectively, will be described with reference to FIGS. 6A, 6B, 7A, and 7B.

Figure 6A:
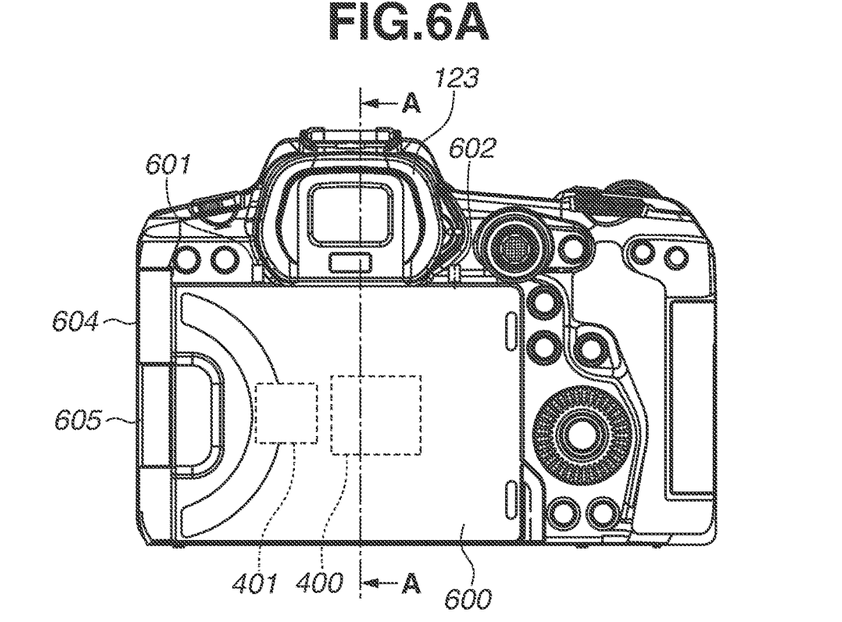
FIGS. 6A and 6B are a rear view and a cross-sectional view, respectively, of the electronic apparatus according to the exemplary embodiment of the present disclosure.
Figure 6B:
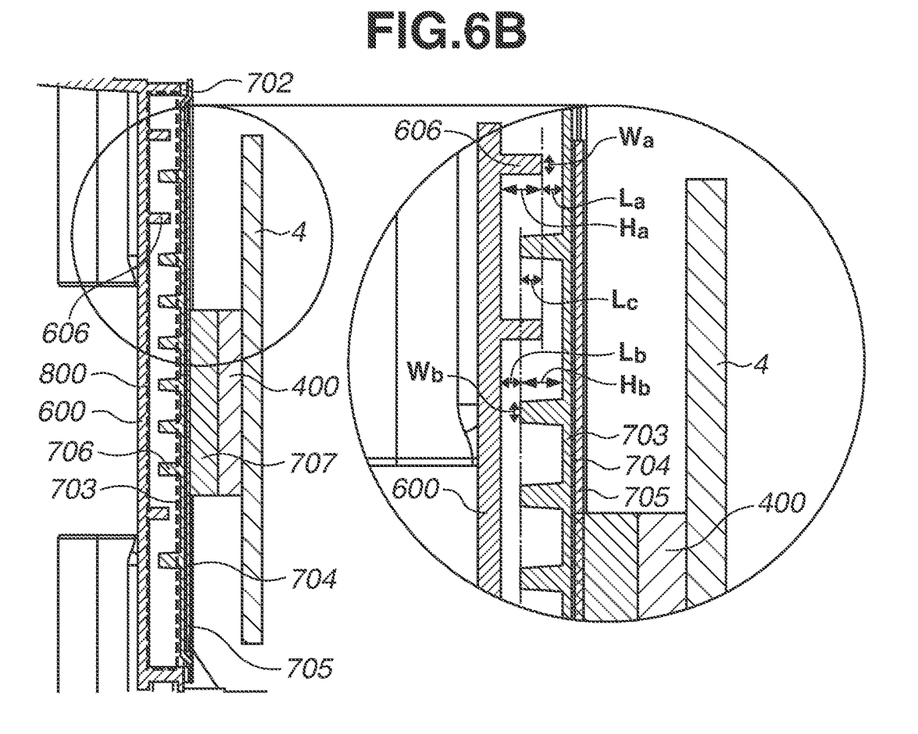

FIG. 6A is a rear view of the camera main body 1 in which the display unit 101 is removed and the image processing system ICs 400 and 401 are each indicated by a hidden line.

FIG. 6B is a cross-sectional view of a duct portion taken along an A-A line centering the image processing system IC 400 illustrated in FIG. 6A.

Figure 7A:
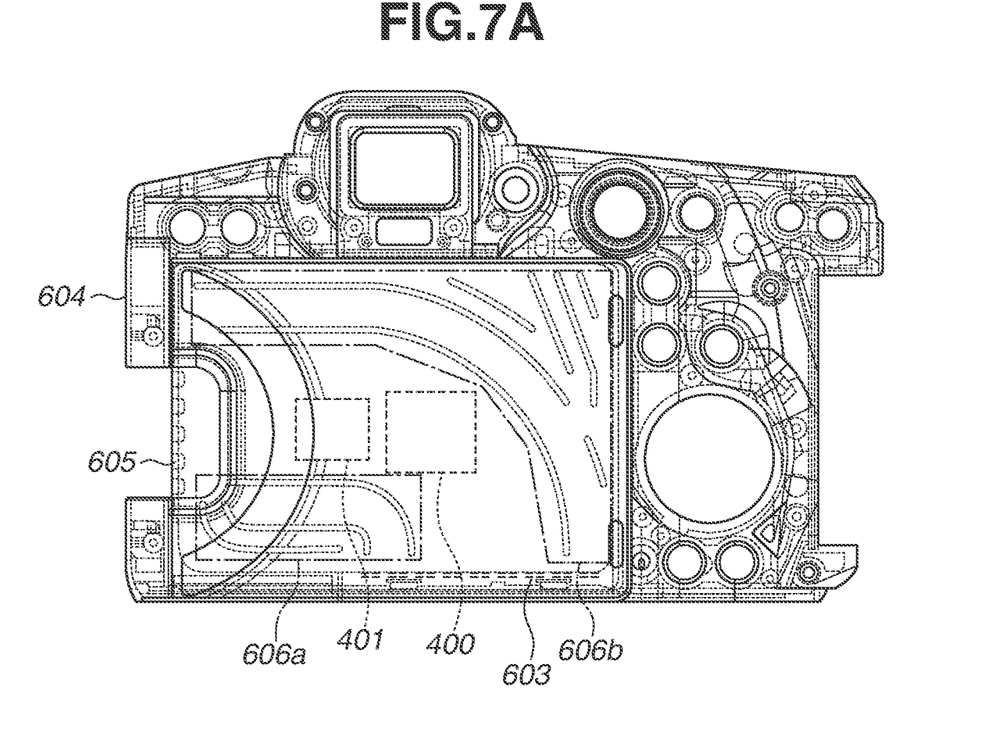
FIGS. 7A and 7B are views illustrating a fin configuration of the rear surface cover, and a fin configuration of a metal plate, respectively, of the electronic apparatus according to the exemplary embodiment of the present disclosure.

FIG. 7A is an external rear view of the rear surface cover 600 in which the rear surface cover fin 606 on the rear surface cover 600 is indicated by a hidden line.

Figure 7B:
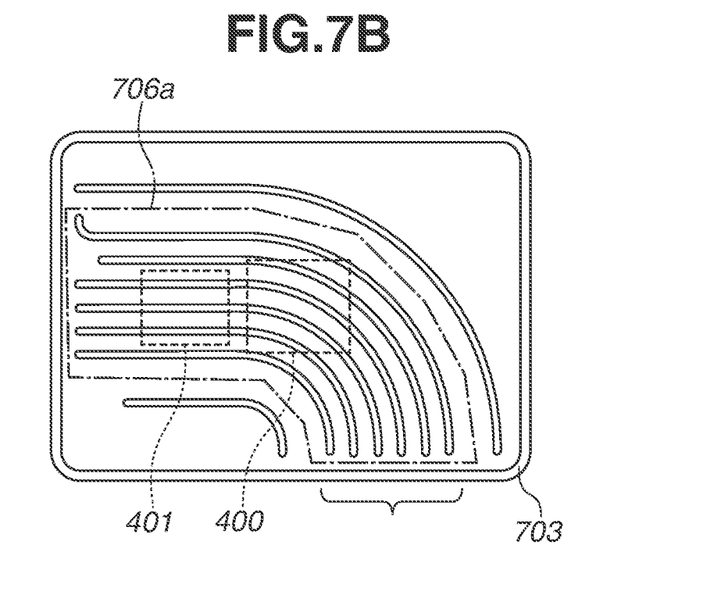

FIG. 7B is a view illustrating the shape of the metal plate fin 706 on the metal plate 703 viewed from the rear surface as with FIG. 6A.

As illustrated in FIG. 6A, the image processing system IC 400 is located near the center of an region for storing the display unit 101, and the image processing system IC 401 is arranged side by side with the image processing system IC 400 in a direction toward the openings 604 and 605 of the duct 800.

As illustrated in the cross-sectional view of FIG. 6B, the image processing system IC 400 is thermally connected to the metal plate 703 with the heat dissipation component 705 therebetween by the heat dissipation rubber 707.

The metal plate fin 706 is provided on the metal plate 703 as described above, and increases the surface area of the metal plate 703, thereby enhancing the heat dissipation into the duct 800 into which air flows from the external accessory (not illustrated).

The heat transferred from the image processing system ICs 400 and 401 to the metal plate 703 is transferred to the rear surface cover 600 via the double-sided adhesive tape 702 on the outer periphery of the duct 800.

In particular, in a case where the fan of the external accessory (not illustrated) is stopped and the heat dissipation into the duct 800 is caused by natural convection, the heat to be transferred to the rear surface cover 600 increases.

To address the issue, in the present exemplary embodiment, the rear surface cover fin 606 is provided on the rear surface cover 600 to enhance the heat dissipation into the duct 800.

Further, as illustrated in FIG. 7A, the shape of the rear surface cover fin 606 has a curvature that forms the air flow passage so that the air flowed in from the opening 603 by the external accessory (not illustrated) described above is released from the openings 604 and 605 through the inside of the camera main body 1.

The heat transferred from the image processing system ICs 400 and 401 to the metal plate 703 is transferred to the rear surface cover 600 via the double-sided adhesive tape 702 on the outer periphery of the duct 800.

For this reason, the rear surface cover fin 606 is disposed in outer peripheral regions 606a and 606b of the duct 800, not in a region 706a including a projection region of the image processing system ICs 400 and 401 that is illustrated in FIG. 7B.

A distance between the outer peripheral regions 606a and 606b of the duct 800 where the rear surface cover fin 606 is disposed is wider than a region where the image processing system ICs 400 and 401 are arranged.

Further, as illustrated in FIG. 7B, the shape of the metal plate fin 706 has a curvature that forms the air flow passage so that the air flowed in from the opening 603 is released from the openings 604 and 605 through the inside of the camera main body 1, as with the rear surface cover fin 606.

The air flowed in from the opening 603 is caused to flow from the image processing system IC 400 generating a large amount of heat to the image processing system IC 401 generating a small amount of heat, and guided to the openings (hereafter also referred to as the air outlets) 604 and 605 by the rear surface cover fin 606 and the metal plate fin 706.

Thus, the heat of the image processing system IC 400 closer to the opening 603 from which the air flows in is preferentially dissipated.

The metal plate fin 706 is provided in the region 706a that includes the air flow passage passing through the projection region of the image processing system ICs 400 and 401, and having the curvature from the opening 603 to the openings 604 and 605.

The heat of the image processing system ICs 400 and 401 is thereby preferentially dissipated into the duct 800, so that the transfer of the heat to the rear surface cover 600 is inhibited.

Next, the height relationship between the rear surface cover fin 606 and the metal plate fin 706 illustrated in the cross section of FIG. 6B will be described.

The rear surface cover fin 606 has a height $H_a$ and a clearance $L_a$ from the metal plate 703.

The metal plate fin 706 has a height $H_b$ and a clearance $L_b$ from the rear surface cover 600.

Each of the rear surface cover fin 606 and the metal plate fin 706 is desirably tall in order to increase the surface area thereof and enhance heat dissipation efficiency. However, if the rear surface cover 600 and the metal plate 703 are in proximity to or in contact with each other, the heat of the image processing system ICs 400 and 401 is preferentially transferred to the rear surface cover 600.

The heat of the image processing system ICs 400 and 401 is preferentially dissipated into the duct 800 by the provision of the clearance $L_a$ and the clearance $L_b$ described above, so that the transfer of the heat to the rear surface cover 600 is inhibited.

In addition, the height $H_a$ of the rear surface cover fin 606 and the height $H_b$ of the metal plate fin 706 overlap each other.

As described above, the rear surface cover fin 606 and the metal plate fin 706 each have the curvature that forms the air flow passage so that the air flowed in from the opening 603 by the external accessory (not illustrated) is released from the openings 604 and 605 through the inside of the camera main body 1.

However, providing a clearance between each of the rear surface cover fin 606 and the metal plate fin 706 and the mating member causes the air flowed in from the opening 603 to spread to the other regions without being guided to the openings 604 and 605, and results in lower air release efficiency.

To address the issue, the height $H_a$ of the rear surface cover fin 606 and the height $H_b$ of the metal plate fin 706 are made overlap each other, so that the spread of the air taken in from the opening 603 to the other regions can be inhibited, and the efficiency of air release to the openings 604 and 605 can be enhanced.

To fulfill both the overlap between the height $H_a$ of the rear surface cover fin 606 and the height $H_b$ of the metal plate fin 706 and the provision of the clearances $L_a$ and $L_b$, each of the clearances $L_a$ and $L_b$ is defined by the following inequality (1), where a fin height overlap amount is $L_c$.

$$L_a \geq L_c, L_b \geq L_c \qquad (1)$$

By satisfying the inequality (1), it is possible to provide the clearances $L_a$ and $L_b$ by which the heat of the image processing system ICs 400 and 401 can be preferentially dissipated into the duct 800 and the heat transfer to the rear surface cover 600 can be inhibited, even if the rear surface cover fin 606 and the metal plate fin 706 overlap each other.

In addition, the clearance $L_b$ of the metal plate fin 706 in the region 706a is larger than the clearance $L_a$ of the rear surface cover fin 606 in the outer peripheral regions 606a and 606b of the duct 800.

$$L_b \geq L_a \qquad (2)$$

By satisfying the above inequality (2), the heat transfer from the image processing system ICs 400 and 401 to the rear surface cover 600 can be further inhibited.

Next, assume that the rear surface cover fin 606 and the metal plate fin 706 have a fin width $W_a$ and a fin width $W_b$, respectively, as illustrated in the cross section of FIG. 6B.

In a case where the fin width $W_a$ and the fin width $W_b$ are greater than the clearance $L_a$ and the clearance $L_b$, respectively, the heat transfer to the rear surface cover 600 increases because of radiation heat.

To address the issue, the relationships between the fin width $W_a$ and the clearance $L_a$ and between the fin width $W_b$ and the clearance $L_b$ are defined by the following inequality (3).

$$L_a \geq W_a, L_b \geq W_b \qquad (3)$$

The fin widths $W_a$ and $W_b$ satisfying the inequality (3) make it possible to preferentially dissipate the heat of the image processing system ICs 400 and 401 into the duct 800, and to inhibit the heat transfer to the rear surface cover 600.

In other words, the heat transfer to the rear surface cover 600 caused by the radiation heat can be inhibited by the provision of the clearances $L_a$ and $L_b$ greater than the fin widths $W_a$ and $W_b$, respectively.

As described above, according to the present exemplary embodiment, heat is released to an appropriate place by control of an air flow passage for forcible air cooling using an accessory such as a fan, and heat dissipation from an exterior cover is actively performed, so that it is possible to inhibit a temperature rise of an exterior housing of an electronic apparatus while dissipating heat of a heat generating circuit board.

Features of the present exemplary embodiment are as follows.

An electronic apparatus (the digital camera 1) includes an exterior cover (the rear surface cover 600), a circuit board (the main board 4) disposed inside the exterior cover (the rear surface cover 600), a first heat generating element (the image processing system IC 400) disposed on the circuit board (the main board 4), and a metal plate (the metal plate 703) thermally connected to the first heat generating element (the image processing system IC 400).

The electronic apparatus (the digital camera 1) further includes a duct (the duct 800) formed in a region between the exterior cover (the rear surface cover 600) and the metal plate (the metal plate 703), an air inlet (the opening 603) formed in the exterior cover (the rear surface cover 600) and configured to take air into the duct (the duct 800), and air outlets (the openings 604 and 605) configured to release air from the duct (the duct 800).

A fin (the rear surface cover fin 606) formed on the exterior cover (the rear surface cover 600) and a fin (the metal plate fin 706) formed on the metal plate (the metal plate 703) are disposed inside the duct (the duct 800) to face each other in a direction orthogonal to the circuit board (the main board 4).

A tip of the fin (the rear surface cover fin 606) of the exterior cover (the rear surface cover 600) and a tip of the fin (the metal plate fin 706) of the metal plate (the metal plate 703) overlap each other in the direction orthogonal to the circuit board (the main board 4), as viewed from a direction parallel to a direction in which the circuit board (the main board 4) extends.

A distance (the clearance $L_a$) between the tip of the fin (the rear surface cover fin 606) of the exterior cover (the rear surface cover 600) and the metal plate (the metal plate 703) in the direction orthogonal to the circuit board (the main board 4) is greater than an amount of the overlap (the fin height overlap amount $L_c$) between the tip of the fin (the rear surface cover fin 606) of the exterior cover (the rear surface cover 600) and the tip of the fin (the metal plate fin 706) of the metal plate (the metal plate 703).

A distance (the clearance $L_b$) between the tip of the fin (the metal plate fin 706) of the metal plate (the metal plate 703) and the exterior cover (the rear surface cover 600) in the direction orthogonal to the circuit board (the main board 4) is greater than the amount of the overlap (the fin height overlap amount $L_c$) between the tip of the fin (the rear surface cover fin 606) of the exterior cover (the rear surface cover 600) and the tip of the fin (the metal plate fin 706) of the metal plate (the metal plate 703).

The fin (the metal plate fin 706) of the metal plate (the metal plate 703) is disposed in a region (the region 706a) overlapping the first heat generating element (the image processing system IC 400) disposed in a central region of the circuit board (the main board 4), as viewed from the direction orthogonal to the circuit board (the main board 4).

The fin (the rear surface cover fin 606) of the exterior cover (the rear surface cover 600) is disposed in regions (the regions 606a and 606b) where the duct (the duct 800) and the first heat generating element (the image processing system IC 400) do not overlap each other, as viewed from the direction orthogonal to the circuit board (the main board 4).

The fin (the rear surface cover fin 606) of the exterior cover (the rear surface cover 600) is not disposed in a region where the duct (the duct 800) and the first heat generating element (the image processing system IC 400) overlap each other, as viewed from the direction orthogonal to the circuit board.

A second heat generating element (the image processing system IC 401) having a smaller heat generation amount than the first heat generating element (the image processing system IC 400) is arranged side by side with the first heat generating element (the image processing system IC 400) on a side of the circuit board (the main board 4) closer to the air outlets (the openings 604 and 605), as viewed from the direction orthogonal to the circuit board (the main board 4).

A distance between two regions (the regions 606a and 606b) of the fin (the rear surface cover fin 606) of the exterior cover (the rear surface cover 600) disposed in an outer edge portion of a region where the first heat generating element (the image processing system IC 400) and the second heat generating element (the image processing system IC 401) are arranged is longer than a long side of each of the first heat generating element (the image processing system IC 400) and the second heat generating element (the image processing system IC 401), as viewed from the direction orthogonal to the circuit board.

The fin (the rear surface cover fin 606) of the exterior cover (the rear surface cover 600) and the fin (the metal plate fin 706) of the metal plate (the metal plate 703) adjacent to each other are formed along an arrangement direction of the first heat generating element (the image processing system IC 400) and the second heat generating element (the image processing system IC 401), as viewed from the direction orthogonal to the circuit board (the main board 4).

The air taken into the duct (the duct 800) from the air inlet (the opening 603) is caused to flow from the first heat generating element (the image processing system IC 400) to the second heat generating element (the image processing system IC 401) and guided to the air outlets (the openings 604 and 605) by the fin (the rear surface cover fin 606) of the exterior cover (the rear surface cover 600) and the fin (the metal cover fin 706) of the metal plate (703), as viewed from the direction orthogonal to the circuit board.

A width (the fin width $W_a$) of the fin (the rear surface cover fin 606) of the exterior cover (the rear surface cover 600) in a direction parallel to the circuit board (the main board 4) is less than the distance (the clearance $L_a$) between the tip of the fin (the rear surface cover fin 606) of the exterior cover (the rear surface cover 600) and the metal plate (the metal plate 703) in the direction orthogonal to the circuit board (the main board 4), as viewed from the direction parallel to the direction in which the circuit board (the main board 4) extends.

A width (the fin width $W_b$) of the fin (the metal plate 706) of the metal plate (the metal plate 703) in a direction parallel to the circuit board (the main board 4) is less than the distance (the clearance $L_b$) between the tip of the fin (the metal plate fin 706) of the metal plate (the metal plate 703) and the exterior cover (the rear surface cover 600) in the direction orthogonal to the circuit board (the main board 4), as viewed from the direction parallel to the direction in which the circuit board (the main board 4) extends.

The followings are features viewed from the direction parallel to the direction in which the circuit board (the main board 4) extends (see FIGS. 6A and 6B).

An area of the region (the region 606*b*) of the fin (the rear surface cover fin 606) of the exterior cover (the rear surface cover 600) disposed in an outer edge portion in an upper part of the region where the first heat generating element (the image processing system IC 400) and the second heat generating element (the image processing system IC 401) are arranged is wider than an area of the region (the region 706*a*) overlapping the first heat generating element (the image processing system IC 400) disposed in a central region of the circuit board (the main board 4).

An area of the region (the region 606*a*) of the fin (the rear surface cover fin 606) of the exterior cover (the rear surface cover 600) disposed in an outer edge portion in a lower part of the region where the first heat generating element (the image processing system IC 400) and the second heat generating element (the image processing system IC 401) are arranged is wider than the area of the region (the region 706*a*) overlapping the first heat generating element (the image processing system IC 400) disposed in the central region of the circuit board (the main board 4).

The following widths are defined along the long side of the metal plate (the heat dissipation metal plate) 703 having a rectangular shape and positioning the air inlet (the opening 603).

A width of the region (the region 706*a*) overlapping the first heat generating element (the image processing system IC 400) disposed in the central region of the circuit board (the main board 4) is longer than a width of the region (the region 606*b*) where the duct (the duct 800) and the first heat generating element (the image processing system IC 400) do not overlap each other (see FIGS. 6A and 6B).

The distance between the tip of the fin (the metal plate fin 706) of the metal plate (the metal plate 703) provided in a region (the region 706*a*) overlapping the first heat generating element (the image processing system IC 400) disposed in a central region of the circuit board (the main board 4) and the exterior cover (the rear surface cover 600) in the direction orthogonal to the circuit board (the main board 4) is defined as the distance $L_b$ (the clearance $L_b$).

As viewed from the direction parallel to the direction in which the circuit board (the main board 4) extends (see FIGS. 6A and 6B), the distance $L_b$ (the clearance $L_b$) is greater than the distance $L_a$ (the clearance $L_a$).

The duct (the duct 800) is cooled by natural heat dissipation, or forcibly air-cooled by a fan built in the electronic apparatus (the digital camera 1) or a fan disposed in an accessory externally and detachably attached to the electronic apparatus (the digital camera 1).

The electronic apparatus (the digital camera 1) further includes an electronic viewfinder (the viewfinder 118), and a rear display unit (the rear display unit 101) disposed on an outer side of the exterior cover (the rear surface cover 600).

The duct (the duct 800) is disposed at a position closer to an optical axis than the electronic viewfinder (the viewfinder 118), as viewed from the direction orthogonal to the circuit board (the main board 4).

The duct (the duct 800) overlaps a region for storing the rear display unit (the rear display unit 101), as viewed from the direction orthogonal to the circuit board (the main board 4).

While the exemplary embodiment of the present disclosure has been described above, the present disclosure is not limited to the above-described exemplary embodiment, and can be modified and changed in various manners within the scope of the spirit thereof.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-026117, filed Feb. 22, 2022, which is hereby incorporated by reference herein in its entirety.

What is claimed is:

1. An electronic apparatus comprising:
an exterior cover;
a circuit board disposed inside the exterior cover;
a first heat generating element disposed on the circuit board;
a metal plate thermally connected to the first heat generating element;
a duct formed in a region between the exterior cover and the metal plate;
an air inlet formed in the exterior cover and configured to take air into the duct; and
an air outlet configured to release air from the duct,
wherein a fin formed on the exterior cover and a fin formed on the metal plate are disposed inside the duct to face each other in a direction orthogonal to the circuit board,
wherein a tip of the fin of the exterior cover and a tip of the fin of the metal plate overlap each other in the direction orthogonal to the circuit board, as viewed from a direction parallel to a direction in which the circuit board extends,
wherein a distance between the tip of the fin of the exterior cover and the metal plate in the direction orthogonal to the circuit board is greater than an amount of the overlap between the tip of the fin of the exterior cover and the tip of the fin of the metal plate,
wherein a distance between the tip of the fin of the metal plate and the exterior cover in the direction orthogonal to the circuit board is greater than the amount of the overlap between the tip of the fin of the exterior cover and the tip of the fin of the metal plate,
wherein the fin of the exterior cover is disposed in a region where the duct and the first heat generating element do not overlap each other, as viewed from the direction orthogonal to the circuit board, and
wherein the fin of the exterior cover is not disposed in a region where the duct and the first heat generating element overlap each other, as viewed from the direction orthogonal to the circuit board.

2. The electronic apparatus according to claim 1, wherein the fin of the metal plate is disposed in a region overlapping the first heat generating element disposed in a central region of the circuit board, as viewed from the direction orthogonal to the circuit board.

3. The electronic apparatus according to claim 1,
wherein a second heat generating element having a smaller heat generation amount than the first heat generating element is arranged side by side with the first heat generating element on a side of the circuit board closer to the air outlet, as viewed from the direction orthogonal to the circuit board,
wherein a distance between two regions of the fin of the exterior cover disposed in an outer edge portion of a region where the first heat generating element and the second heat generating element are arranged is longer than a long side of each of the first heat generating element and the second heat generating element, as viewed from the direction orthogonal to the circuit board, wherein the fin of the exterior cover and the fin of the metal plate are formed along an arrangement direction of the first heat generating element and the second heat generating element, as viewed from the direction orthogonal to the circuit board, and wherein the air taken into the duct from the air inlet is caused to flow from the first heat generating element to the second heat generating element and guided to the air outlet by the fin of the exterior cover and the fin of the metal plate, as viewed from the direction orthogonal to the circuit board.

4. The electronic apparatus according to claim 1, wherein a width of the fin of the exterior cover in a direction parallel to the circuit board is less than the distance between the tip of the fin of the exterior cover and the metal plate in the direction orthogonal to the circuit board, as viewed from the direction parallel to the direction in which the circuit board extends.

5. The electronic apparatus according to claim 1, wherein a width of the fin of the metal plate in a direction parallel to the circuit board is less than the distance between the tip of the fin of the metal plate and the exterior cover in the direction orthogonal to the circuit board, as viewed from the direction parallel to the direction in which the circuit board extends.

6. The electronic apparatus according to claim 1, wherein the tip of the fin of the metal plate is provided in a region overlapping the first heat generating element disposed in a central region of the circuit board and the distance between the tip of the fin of the metal plate and the exterior cover in the direction orthogonal to the circuit board is greater than the distance between the tip of the fin of the exterior cover and the metal plate in the direction orthogonal to the circuit board, as viewed from the direction parallel to the direction in which the circuit board extends.

7. The electronic apparatus according to claim 1, wherein the duct is configured to be cooled by natural heat dissipation, or forcibly air-cooled by a fan built in the electronic apparatus or a fan disposed in an accessory externally and detachably attached to the electronic apparatus.

8. The electronic apparatus according to claim 1, further comprising:

an electronic viewfinder; and a rear display unit disposed on an outer side of the exterior cover, wherein the duct is disposed at a position closer to an optical axis than the electronic viewfinder, as viewed from the direction orthogonal to the circuit board, and wherein the duct overlaps a region for storing the rear display unit, as viewed from the direction orthogonal to the circuit board.

* * * * *